US012647030B2

(12) United States Patent
Kim et al.

(10) Patent No.: US 12,647,030 B2
(45) Date of Patent: Jun. 2, 2026

(54) POWER SUPPLY CIRCUIT AND METHOD FOR CONTROLLING POWER SUPPLY CIRCUIT

(71) Applicant: Kinetic Technologies International Holdings LP, Toronto (CA)

(72) Inventors: Tong H. Kim, Chandler, AZ (US); Lu Chen, San Jose, CA (US); Thomas DeLurio, San Jose, CA (US); Jan Nilsson, Sunnyvale, CA (US); Brian North, Los Gatos, CA (US); Karl Richard Volk, Scotts Valley, CA (US)

(73) Assignee: Kinetic Technologies International Holdings LP, Toronto (CA)

( * ) Notice: Subject to any disclaimer, the term of this patent is extended or adjusted under 35 U.S.C. 154(b) by 154 days.

(21) Appl. No.: 18/762,505

(22) Filed: Jul. 2, 2024

(65) Prior Publication Data

US 2026/0012088 A1 Jan. 8, 2026

(51) Int. Cl.
*H02M 3/07* (2006.01)

(52) U.S. Cl.
CPC ..................................... *H02M 3/07* (2013.01)

(58) Field of Classification Search
CPC ........ H02M 3/07; H02M 3/158; H02M 3/156; H02M 1/088
See application file for complete search history.

(56) References Cited

U.S. PATENT DOCUMENTS

| | | | |
|---|---|---|---|
| 8,089,788 B2 * | 1/2012 | Jain | H02M 3/07 |
| | | | 363/60 |
| 9,343,960 B2 * | 5/2016 | Cannankurichi Vijaya Mohan | .... |
| | | | H02M 3/07 |
| 11,757,357 B2 * | 9/2023 | Oshita | H02M 3/073 |
| | | | 713/323 |
| 2013/0043731 A1 * | 2/2013 | Mullin | H02J 7/0014 |
| | | | 307/80 |

(Continued)

FOREIGN PATENT DOCUMENTS

| | | | | |
|---|---|---|---|---|
| CN | 114900036 A | 8/2022 | | |
| CN | 117833650 A | * 4/2024 | .............. | H02M 1/14 |

(Continued)

OTHER PUBLICATIONS

Machine Translation (Year: 2024).*

(Continued)

*Primary Examiner* — Thienvu V Tran
*Assistant Examiner* — Yahveh Conas Tiorres
(74) *Attorney, Agent, or Firm* — Sheppard Mullin Richter & Hampton LLP

(57) ABSTRACT

A power supply circuit includes a power circuit, switch capacitor voltage regulators, a controller, a current sensor, and a time sensor. Each of the switch capacitor voltage regulators is coupled in series with the power circuit. The controller is coupled to each of the switch capacitor voltage regulators. The current sensor is configured to sense a current from the switch capacitor voltage regulators to the power circuit. The time sensor is configured to sense a time (Continued)

at which the current sensor senses the current. The controller is configured to receive current values and time information from the current sensor and the time sensor, and simultaneously turn on the switch capacitor voltage regulators when determining that the $\Delta i/\Delta t$ value is equal to or greater than a threshold.

20 Claims, 3 Drawing Sheets

(56) References Cited

U.S. PATENT DOCUMENTS

| | | | | | |
|---|---|---|---|---|---|
| 2014/0344589 | A1* | 11/2014 | Muthukaruppan | ..... | H02M 3/07 |
| | | | | | 323/280 |
| 2015/0022169 | A1* | 1/2015 | Cannankurichi Vijaya Mohan | .... | |
| | | | | | H02M 3/07 |
| | | | | | 323/282 |
| 2017/0111052 | A1* | 4/2017 | Liu | ..................... | H03M 1/0604 |
| 2021/0075316 | A1* | 3/2021 | Oshita | ..................... | H02M 1/00 |
| 2021/0099085 | A1* | 4/2021 | Lau | ......................... | H02M 3/07 |
| 2023/0198384 | A1* | 6/2023 | Butzen | ................... | H02M 3/07 |
| | | | | | 323/271 |
| 2024/0154526 | A1* | 5/2024 | Chen | .................. | H02M 1/0009 |
| 2025/0211085 | A1* | 6/2025 | Zhang | ................ | H02M 1/0006 |

FOREIGN PATENT DOCUMENTS

| | | |
|---|---|---|
| KR | 10-2022-0168655 A | 12/2022 |
| KR | 10-2024-0058868 A | 5/2024 |

OTHER PUBLICATIONS

PCT International Search Report and the Written Opinion mailed Nov. 12, 2025, issued in International Application No. PCT/US2025/036031 (8 pages).

* cited by examiner

Figure 3:
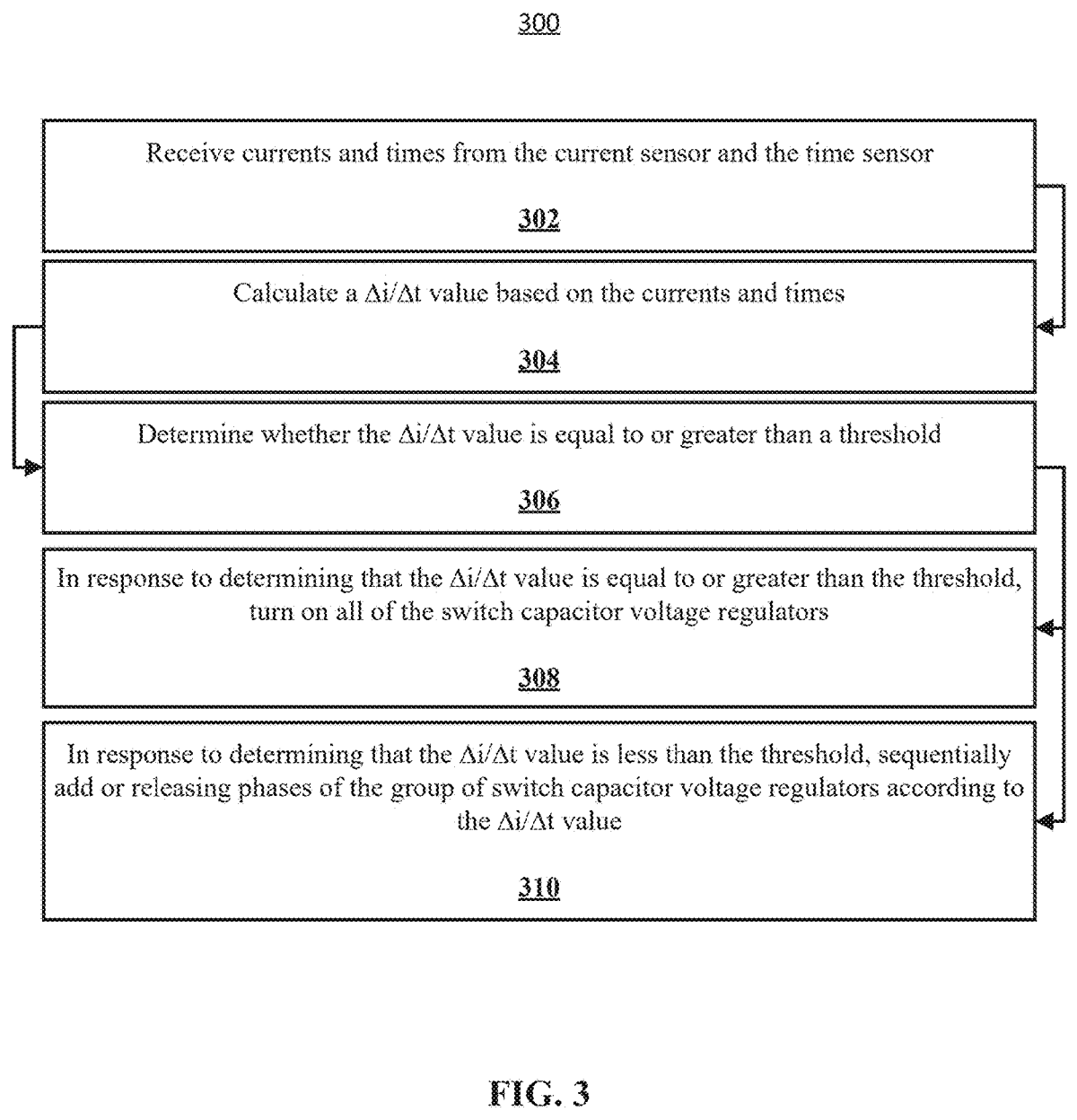

300

Receive currents and times from the current sensor and the time sensor

302

Calculate a $\Delta i/\Delta t$ value based on the currents and times

304

Determine whether the $\Delta i/\Delta t$ value is equal to or greater than a threshold

306

In response to determining that the $\Delta i/\Delta t$ value is equal to or greater than the threshold, turn on all of the switch capacitor voltage regulators

308

In response to determining that the $\Delta i/\Delta t$ value is less than the threshold, sequentially add or releasing phases of the group of switch capacitor voltage regulators according to the $\Delta i/\Delta t$ value

POWER SUPPLY CIRCUIT AND METHOD FOR CONTROLLING POWER SUPPLY CIRCUIT

TECHNICAL FIELD

The present disclosure relates to power supply circuits and methods for controlling power supply circuits, and more particularly, to power supply circuits containing power management integrated circuits and methods for controlling same.

BACKGROUND

An electronic device generally requires a circuit to regulate power supplied to other components within the electronic device. Many advanced electronic devices require precise, fast, and stable power supply to function properly. It has been increasing difficult to satisfy these requirements in the modern electronic devices.

SUMMARY

In one general aspect, a power supply circuit may include a power circuit configured to provide power. The power supply circuit may also include a switch capacitor voltage regulators, where each regulator of the switch capacitor voltage regulators is coupled in series with the power circuit. The circuit may furthermore include a controller coupled to each regulator of the switch capacitor voltage regulators. The circuit may include a current sensor coupled between the power circuit and the switch capacitor voltage regulators and configured to sense a current from the switch capacitor voltage regulators to the power circuit. The circuit may include a time sensor coupled between the power circuit and the switch capacitor voltage regulators and configured to sense a time at which the current sensor senses the current. The controller is configured to receive current values and time information from the current sensor and the time sensor, calculate a $\Delta i/\Delta t$ value, indicating a change in current over a change in time, based on the current values and the time information, determine whether the $\Delta i/\Delta t$ value is equal to or greater than a threshold, and in response to determining that the $\Delta i/\Delta t$ value is equal to or greater than the threshold, simultaneously turn on all regulators of the switch capacitor voltage regulators.

In some embodiments, a regulator of the switch capacitor voltage regulators may include a plurality of phases, where a phase of the plurality of phases includes a capacitor and a switch connected in series.

In some embodiments, the controller may be configured to turn on the switch capacitor voltage regulators by simultaneously turning on the plurality of phases.

In some embodiments, each phase of the plurality of phases is configured to turn on within less than 1 μs.

In some embodiments, the switch may include a first terminal coupled to the capacitor and a second terminal coupled to a first terminal of an output capacitor.

In some embodiments, the output capacitor may have a second terminal coupled to ground.

In some embodiments, each regulator of the switch capacitor voltage regulators may be coupled to an output capacitor. Each output capacitor may include a first terminal coupled to the plurality of phases of a corresponding switch capacitor voltage regulator and a second terminal coupled to ground.

In some embodiments, a first terminal of an output capacitor may be coupled to a first terminal of an input capacitor of the power circuit.

In some embodiments, an input capacitor of the power circuit may have a second terminal coupled to ground.

In some embodiments, the power supply circuit may further include a voltage sensor coupled between the power circuit and the switch capacitor voltage regulators and configured to sense a voltage output from the switch capacitor voltage regulators.

In some embodiments, the switch may be a metal-oxide-semiconductor field-effect transistor (MOSFET) comprising a gate, a source, and a drain.

In some embodiments, the controller may be configured to turn on the switch capacitor voltage regulators by directly turning on gates of the MOSFETs.

In some embodiments, the controller may be configured to turn on the switch capacitor voltage regulators by controlling each the switch capacitor voltage regulator to turn on gates of the MOSFETs.

In some embodiments, the power supply circuit may further include a system-on-chip (SoC) device, wherein the power circuit is configured to provide power to the SoC device.

In another aspect, a method for controlling a power supply circuit is provided. The power supply circuit may include a power circuit, a switch capacitor voltage regulators, a controller coupled to each regulator of the switch capacitor voltage regulators, a current sensor, and a time sensor. Each regulator of the switch capacitor voltage regulators is coupled in series with the power circuit. The current sensor is coupled between the power circuit and the switch capacitor voltage regulators and configured to sense a current from the switch capacitor voltage regulators to the power circuit. The time sensor is coupled between the power circuit and the switch capacitor voltage regulators and configured to sense a time at which the current sensor senses the current. The method includes operations performed by the controller, where the operations may include: receiving current values and time information from the current sensor and the time sensor, calculating a $\Delta i/\Delta t$ value, indicating a change in current over a change in time, based on the current values and the time information, determining whether the $\Delta i/\Delta t$ value is equal to or greater than a threshold, and in response to determining that the $\Delta i/\Delta t$ value is equal to or greater than the threshold, simultaneously turning on the switch capacitor voltage regulators.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 is a flowchart of an example process performed by a controller according to one example embodiment.

DETAILED DESCRIPTION OF EMBODIMENTS

Figure 1:
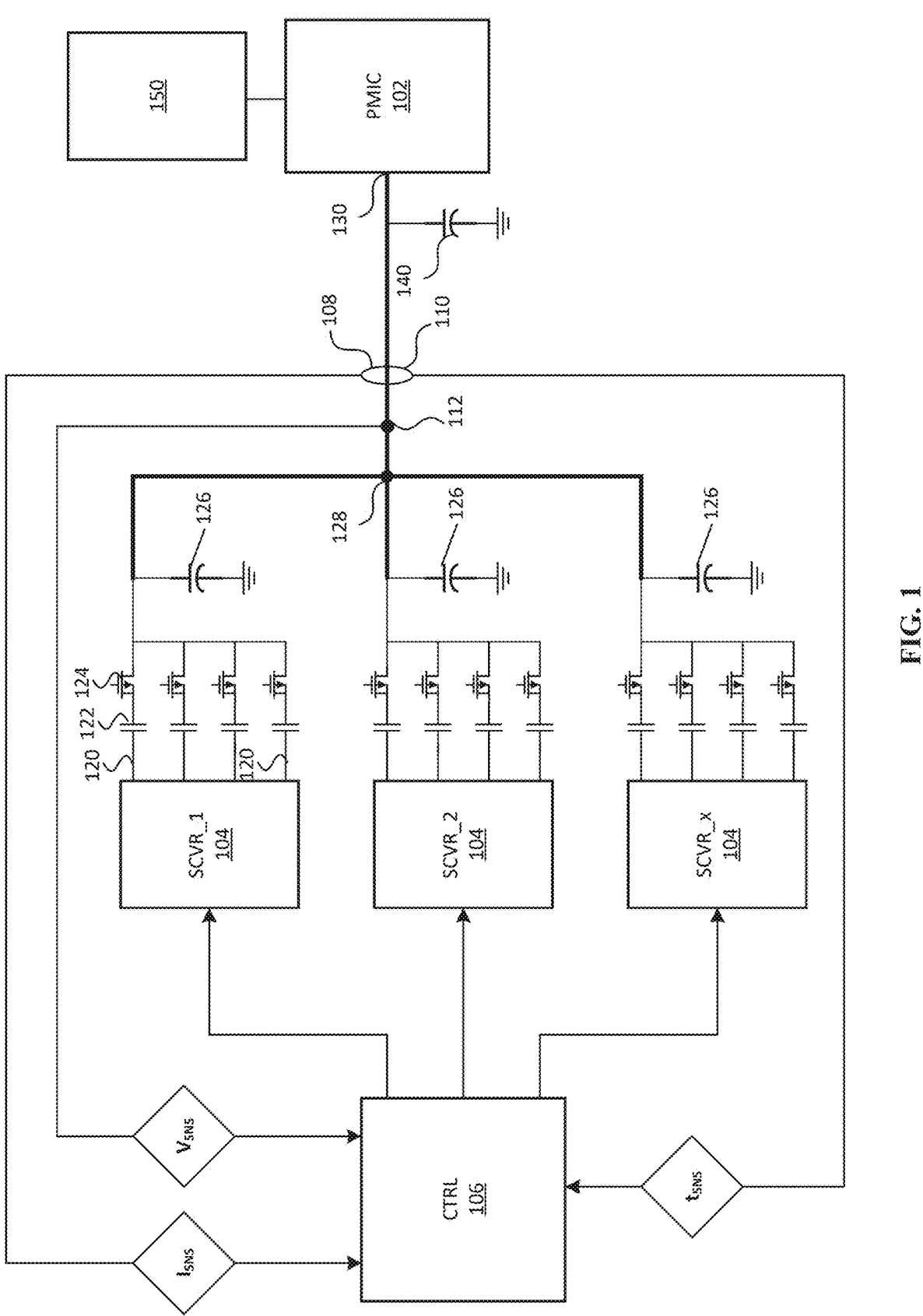
FIG. 1 is a circuit diagram of a power supply circuit, according to one embodiment of the present invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to power supply circuits and methods for controlling power supply circuits. The power supply circuit may include one or more switch capacitor voltage regulators (SCVRs).

Currently, SCVRs in a power supply circuit are designed to add/release phases and/or SCVR devices based on detecting the output voltage droop. When the output voltage droop is detected, phases of the SCVRs and the SCVRs are sequentially added/turned on. And when the output voltage droop is mitigated, the phases of the SCVRs and the SCVRs are sequentially released/shed. This method is inherently very slow in responding to very high load demands, where load is indicated by a change in current over time or $\Delta i/\Delta t$. Under very high load demands, if the voltage droop is not mitigated quickly enough, the entire system can become non-functional, which is often referred to as a lockout. Once in a lockout state, the circuit needs to be power-cycled in order to function again, resulting lost time and/or efficiency. The techniques disclosed herein increase the transient response to high $\Delta i/\Delta t$ loading conditions, resolving the system lockout problem.

Embodiments will now be explained with accompanying figures. Reference is first made to FIG. 1. FIG. 1 is a circuit diagram of a power supply circuit 100, according to one embodiment. The power supply circuit 100 includes a power circuit 102 configured to provide power to an electronic device 150. For example, the electronic device that receives the power from the power circuit 102 may be an system-on-chip (SoC) device or any other devices that require a power supply. The power supply circuit 100 further includes a switch capacitor voltage regulators (SCVRs) 104. Each regulator of the switch capacitor voltage regulators is coupled in series with the power circuit 102. The power supply circuit 100 further includes a controller (CTRL) 106 coupled to each regulator of the switch capacitor voltage regulators 104. In some examples, the SCVRs 104 are coupled in parallel to the controller 106. The power supply circuit 100 further includes a current sensor 108, a time sensor 110, and a voltage sensor 112.

The current sensor 108 is coupled between the power circuit 102 and the switch capacitor voltage regulators 104 and is configured to sense a current ($I_{SNS}$) from the switch capacitor voltage regulators 104 to the power circuit 102. The time sensor 110 is coupled between the power circuit 102 and the switch capacitor voltage regulators 104 and configured to sense a time ($T_{SNS}$) at which the current sensor 108 senses the current. The controller 106 is configured to receive current values and time information from the current sensor 108 and the time sensor 110, respectively. The controller 106 is further configured to calculate a $\Delta i/\Delta t$ value, indicating a change in current over a change in time, based on the current values and time information, determine whether the $\Delta i/\Delta t$ value is equal to or greater than a threshold, and in response to determining that the $\Delta i/\Delta t$ value is equal to or greater than the threshold, simultaneously turn on the switch capacitor voltage regulators 104. The controller is configured to, in response to determining that the $\Delta i/\Delta t$ value is less than the threshold, sequentially add or release phases of the switch capacitor voltage regulators 104 according to the $\Delta i/\Delta t$ value.

According to the techniques disclosed, when it is detected that the output of the switch capacitor voltage regulators 104 is experiencing a very high $\Delta i/\Delta t$, e.g., the $\Delta i/\Delta t$ value is equal to or greater than a predetermined threshold, the controller 106 can simultaneously turn on the switch capacitor voltage regulators 104 to provide power to the backend electronic device 150. This can prevent the entire system from going into a complete lockout, which would result in circuit failure. On the other hand, when the power demand is under a normal condition, e.g., the $\Delta i/\Delta t$ value is less than the threshold, the controller 106 can sequentially add or release phases of the switch capacitor voltage regulators 104 according to the $\Delta i/\Delta t$ value.

Figure 2:
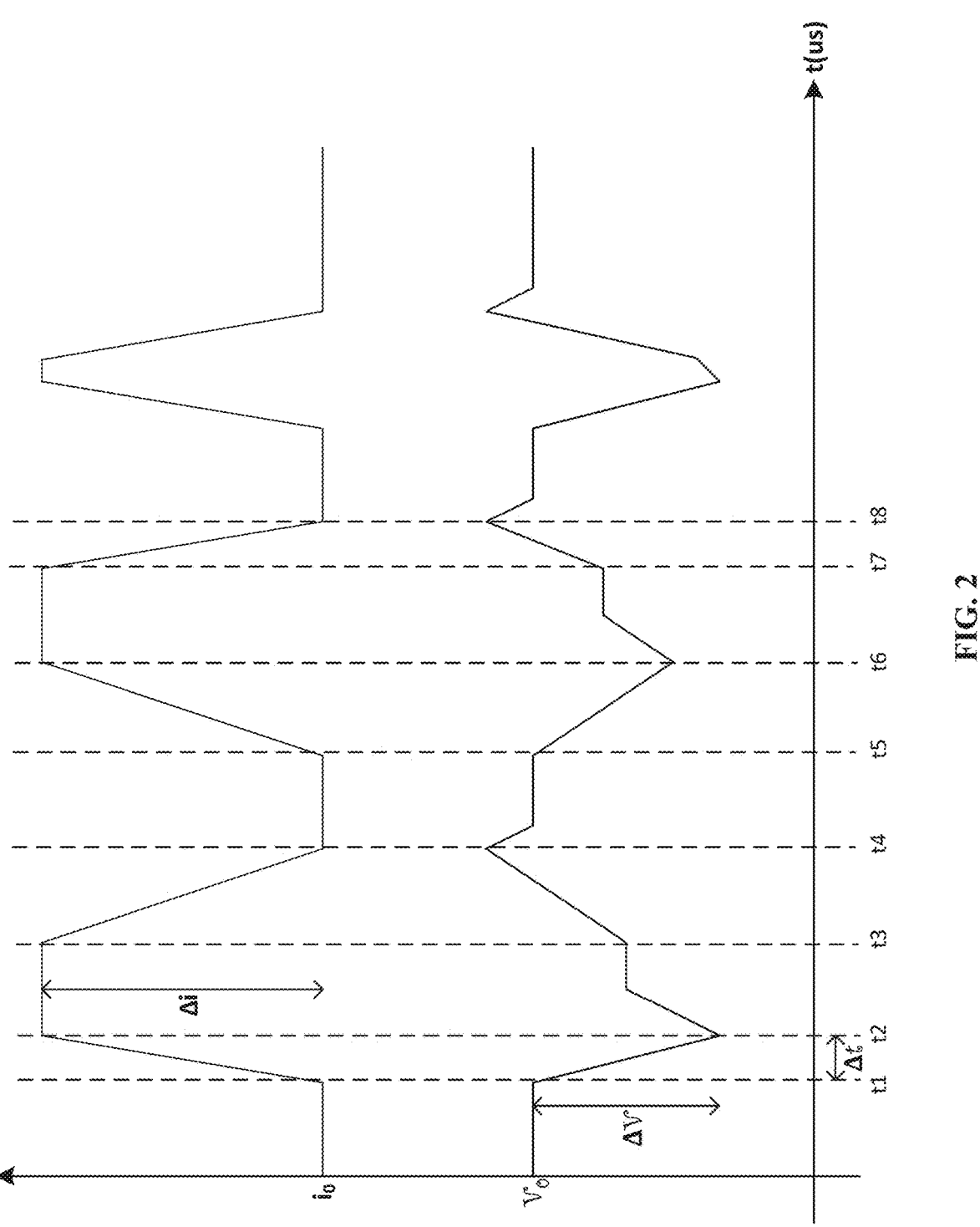
FIG. 2 is a voltage-current versus time diagram according to one embodiment of the present invention.

FIG. 2 is a voltage-current versus time diagram according to one embodiment. As shown in FIG. 2, between times t1 and t2, the current drawn by the power circuit 102 increases quickly, which causes a voltage droop, where the voltage droop can be detected by the voltage sensor 112. In response to the rapid power demand, the controller 106 determines whether the $\Delta i/\Delta t$ value of the power demand is equal to or greater than the threshold. If the $\Delta i/\Delta t$ value of the power demand is indeed equal to or greater than the threshold, the controller 106 may turn on the switch capacitor voltage regulators 104 simultaneously to satisfy the rapid power demand. This then reduces or eliminates the voltage droop as shown in FIG. 2.

In some instances, when the power demand is not large and quick, e.g., the $\Delta i/\Delta t$ value is less than the threshold, as shown in FIG. 2 between times t5 and t6, the controller 106 can sequentially add phases of the switch capacitor voltage regulators 104 according to the $\Delta i/\Delta t$ value. It should be noted that the diagrams shown in FIG. 2 are merely illustrative and may not necessarily reflect the correct scale.

The controller 106 is also configured to sequentially release phases of the switch capacitor voltage regulators 104 when the power demand is reduced as shown at the time periods between t3 and t4, or between t7 and t8.

Referring back to FIG. 1, in some embodiments, each regulator of the switch capacitor voltage regulators 104 may include a plurality of phases 120 disposed as outputs of the switch capacitor voltage regulators 104. In some embodiments, a phase of the phases 120 may include a capacitor 122 and a switch 124 connected in series. The phases 120 of a switch capacitor voltage regulator 104 are connected in parallel. The controller 106 is configured to turn on the switch capacitor voltage regulators 104 by simultaneously turning on the phases 120 of the switch capacitor voltage regulators 104. In some embodiments, in response to the controller 106 turning on the switch capacitor voltage regulators 104 simultaneously, the phases of the switch capacitor voltage regulators may be turned on within less than 1 μs.

The switch 124 may be any electrical switches, such as a metal-oxide-semiconductor field-effect transistor (MOS-FET), a diode, or other suitable switches, if they support a fast turn-on or turn-off response. The example shown in FIG. 1 for the switch 124 is a p-MOSFET having a gate, a source, and a drain.

In some embodiments, to simultaneously turn on the switch capacitor voltage regulators 104, the controller 106 may be configured to directly turn on the gates of the MOSFETs of the phases 120 of the switch capacitor voltage regulators 104. In this example, each of the gates of the MOSFETs of the switches 124 may be directly coupled to the controller 106.

In some embodiments, to simultaneously turn on the switch capacitor voltage regulators 104, the controller 106 may be configured to control the switch capacitor voltage regulators 104 to turn on gates of the MOSFETs of the phases 120 of the switch capacitor voltage regulators 104. In this example, each of the gates of the MOSFETs of the switches 124 may be directly coupled to the corresponding switch capacitor voltage regulator 104.

In some embodiments, each of the switches 124 may include a first terminal coupled to a corresponding capacitor 122 and a second terminal coupled to a first terminal of an output capacitor 126. The output capacitor 126 has a second terminal coupled to ground. The first terminals of the output capacitors 126 are connected to a mid-point 128 before connecting to the input port 130 of the power circuit 102.

The current sensor 108, the time sensor 110, and the voltage sensor 112 are disposed between the mid-point 128 the input port 130 of the power circuit 102. The voltage sensor 112 is configured to sense an output voltage from the switch capacitor voltage regulators 104.

As shown in FIG. 1, the power supply circuit 100 may further include an input capacitor 140 of the power circuit 102. The first terminals of the output capacitors 126 are coupled to a first terminal of the input capacitor 140 of the power circuit 102. The input capacitor 140 of the power circuit 102 has a second terminal coupled to ground.

The voltage sensor 112 is configured to sense an output voltage ($V_{SNS}$) from the switch capacitor voltage regulators 104.

In some embodiments, the power supply circuit 100 may further include an SoC device 150. The power circuit 102 is configured to provide power to the SoC device 150.

Although FIG. 1 shows three switch capacitor voltage regulators 104, it should be understood that more or fewer switch capacitor voltage regulators 104 may be included in the power supply circuit 100.

FIG. 3 is a flowchart of an example process 300 performed by the controller 106 according to one example embodiment.

As shown in FIG. 3, process 300 may include receiving current values and time information from the current sensor and the time sensor (block 302). For example, the controller 106 may receive current values and time information from the current sensor 108 and the time sensor 110, as described above. As also shown in FIG. 3, the process 300 may include calculating a Δi/Δt value based on the current values and time information (block 304). For example, device may calculate a Δi/Δt value based on the current values and time information, as described above. As further shown in FIG. 3, the process 300 may include determining whether the Δi/Δt value is equal to or greater than a threshold (block 306). For example, the controller 106 may determine whether the Δi/Δt value is equal to or greater than a threshold, as described above. As also shown in FIG. 3, the process 300 may include in response to determining that the Δi/Δt value is equal to or greater than the threshold, simultaneously turning on the switch capacitor voltage regulators (block 308). For example, the controller 106 may in response to determining that the Δi/Δt value is equal to or greater than the threshold, simultaneously turn on the switch capacitor voltage regulators 104, as described above. As further shown in FIG. 3, the process 300 may include in response to determining that the Δi/Δt value is less than the threshold, sequentially adding or releasing phases of the switch capacitor voltage regulators 104 according to the Δi/Δt value (block 310). For example, the controller 106 may in response to determining that the Δi/Δt value is less than the threshold, sequentially add or releasing phases 120 of the switch capacitor voltage regulators 104 according to the Δi/Δt value, as described above.

Although FIG. 3 shows example blocks of the process 300, in some implementations, the process 300 may include additional blocks, fewer blocks, different blocks, or differently arranged blocks than those depicted in FIG. 3. Additionally, or alternatively, two or more of the blocks of process 300 may be performed in parallel.

In summary, the disclosed techniques address the voltage droops of a power supply circuit with two unique approaches. First, the techniques include an "ALL-ON" mode such that when the power demand is large and rapid, the power supply circuit can respond quickly (e.g., within less than 1 μs) by simultaneously turning on the phases of the switch capacitor voltage regulators. Second, in order to facilitate the ALL-ON mode, the disclosed techniques include monitoring the time difference sense (Δt or dt) for the Δi/Δt or di/dt sense. This allows the power supply circuit to quickly respond to a power demand surge.

The ALL-ON mode fundamentally bypasses the sequential turn-on mode (where the phases of the switch capacitor voltage regulators are sequentially turned on, which can take tens of seconds). In the ALL-ON mode, all the phases and switch capacitor voltage regulators are simultaneously turned on, given the right conditions. That is, both Δi (or di) and Δt (or dt) conditions are met. Once these two setpoint conditions are detected by the controller (or the switch capacitor voltage regulators), the controller can turn on all the phases and switch capacitor voltage regulators simultaneously.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A power supply circuit comprising:

a power circuit configured to provide power;

switch capacitor voltage regulators, wherein each regulator of the switch capacitor voltage regulators is coupled in series with the power circuit;

a current sensor coupled between the power circuit and the switch capacitor voltage regulators and configured to sense a current from the switch capacitor voltage regulators to the power circuit;

a time sensor coupled between the power circuit and the switch capacitor voltage regulators and configured to sense a time at which the current sensor senses the current; and a controller coupled to each regulator of the switch capacitor voltage regulators, wherein the controller is configured to:

receive current values and time information from the current sensor and the time sensor, calculate a $\Delta i/\Delta t$ value, indicating a change in current over a change in time, based on the current values and the time information, determine whether the $\Delta i/\Delta t$ value is equal to or greater than a threshold, and in response to determining that the $\Delta i/\Delta t$ value is equal to or greater than the threshold, simultaneously turn on all regulators of the switch capacitor voltage regulators.

2. The power supply circuit of claim 1, wherein a regulator of the switch capacitor voltage regulators comprises a plurality of phases, wherein a phase of the plurality of phases includes a capacitor and a switch connected in series.

3. The power supply circuit of claim 2, wherein the controller is configured to turn on the switch capacitor voltage regulators by simultaneously turning on the plurality of phases.

4. The power supply circuit of claim 2, wherein each phase of the plurality of phases is configured to turn on within less than 1 µs.

5. The power supply circuit of claim 2, wherein the switch includes a first terminal coupled to the capacitor and a second terminal coupled to a first terminal of an output capacitor.

6. The power supply circuit of claim 5, wherein the output capacitor has a second terminal coupled to ground.

7. The power supply circuit of claim 2, wherein the switch is a metal-oxide-semiconductor field-effect transistor (MOSFET) comprising a gate, a source, and a drain.

8. The power supply circuit of claim 7, wherein the controller is configured to turn on the switch capacitor voltage regulators by directly turning on gates of the MOSFETs of the plurality of phases.

9. The power supply circuit of claim 7, wherein the controller is configured to turn on the switch capacitor voltage regulators by controlling each switch capacitor voltage regulator to turn on gates of the MOSFETs of the plurality of phases.

10. The power supply circuit of claim 2, wherein each regulator of the switch capacitor voltage regulators is coupled to an output capacitor, wherein each output capacitor includes a first terminal coupled to the plurality of phases of a corresponding switch capacitor voltage regulator and a second terminal coupled to ground.

11. The power supply circuit of claim 10, wherein a first terminal of an output capacitor is coupled to a first terminal of an input capacitor of the power circuit.

12. The power supply circuit of claim 1, wherein an input capacitor of the power circuit has a second terminal coupled to ground.

13. The power supply circuit of claim 1, further comprising a voltage sensor coupled between the power circuit and the switch capacitor voltage regulators and configured to sense a voltage output from the switch capacitor voltage regulators.

14. The power supply circuit of claim 1, further comprising a system-on-chip (SoC) device, wherein the power circuit is configured to provide power to the SoC device.

15. A method for controlling a power supply circuit, wherein the power supply circuit comprises:

a power circuit configured to provide power;

switch capacitor voltage regulators, wherein each regulator of the switch capacitor voltage regulators is coupled in series with the power circuit;

a current sensor coupled between the power circuit and the switch capacitor voltage regulators and configured to sense a current from the switch capacitor voltage regulators to the power circuit;

a time sensor coupled between the power circuit and the switch capacitor voltage regulators and configured to sense a time at which the current sensor senses the current; and a controller coupled to each regulator of the switch capacitor voltage regulators, wherein the method comprises operations performed by the controller, the operations comprising:

receiving current values and time information from the current sensor and the time sensor, calculating a $\Delta i/\Delta t$ value, indicating a change in current over a change in time, based on the current values and the time information, determining whether the $\Delta i/\Delta t$ value is equal to or greater than a threshold, and in response to determining that the $\Delta i/\Delta t$ value is equal to or greater than the threshold, simultaneously turning on the switch capacitor voltage regulators.

16. The method of claim 15, wherein a regulator of the switch capacitor voltage regulators comprises a plurality of phases, wherein a phase of the plurality of phases includes a capacitor and a switch connected in series, and wherein turning on the switch capacitor voltage regulators is performed by simultaneously turning on the plurality of phases.

17. The method of claim 16, wherein each phase of the plurality of phases is configured to turn on within less than 1 µs.

18. The method of claim 15, wherein a regulator of the switch capacitor voltage regulators comprises a plurality of phases, wherein a phase of the plurality of phases includes a capacitor and a switch connected in series, wherein the switch is a metal-oxide-semiconductor field-effect transistor (MOSFET) comprising a gate, a source, and a drain.

19. The method of claim 18, wherein turning on the switch capacitor voltage regulators is performed by directly turning on gates of the MOSFETs.

20. The method of claim 18, wherein turning on the switch capacitor voltage regulators is performed by controlling the switch capacitor voltage regulators to turn on gates of the MOSFETs.

* * * * *